United States Patent [19]
Saylor et al.

[11] 4,059,278
[45] Nov. 22, 1977

[54] PISTON RING SPACER-EXPANDER WITH OVERLAP-PREVENTING EXPANDER JOINT

[75] Inventors: Lee H. Saylor, Muskegon; Roy E. Overway, Grand Haven, both of Mich.

[73] Assignee: Sealed Power Corporation, Muskegon, Mich.

[21] Appl. No.: 711,850

[22] Filed: Aug. 5, 1976

[51] Int. Cl.² .............................................. F02F 5/00
[52] U.S. Cl. .................................... 277/139; 267/1.5
[58] Field of Search ................... 277/139, 140, 155, 9, 277/9.5, 11, 218–222, 138, 141, 76; 267/1.5

[56] References Cited

U.S. PATENT DOCUMENTS 3,427,014  2/1969  De Bruin ........................ 277/139 X
3,695,622  10/1972  Davis et al. ........................ 277/139

FOREIGN PATENT DOCUMENTS 538,685  8/1941  United Kingdom ................. 277/139

*Primary Examiner*—Robert S. Ward
*Attorney, Agent, or Firm*—Barnes, Kisselle, Raisch & Choate

[57] ABSTRACT

In a parted corrugated spacer-expander for a piston oil control ring, an improved expander end joint for preventing installation of the expander should overlap occur between the expander ends in which the respective expander ends are each formed in a multiple-bend box-like structure which is self-supporting under stress from the opposing expander end in either the circumferential or the radial direction.

10 Claims, 7 Drawing Figures

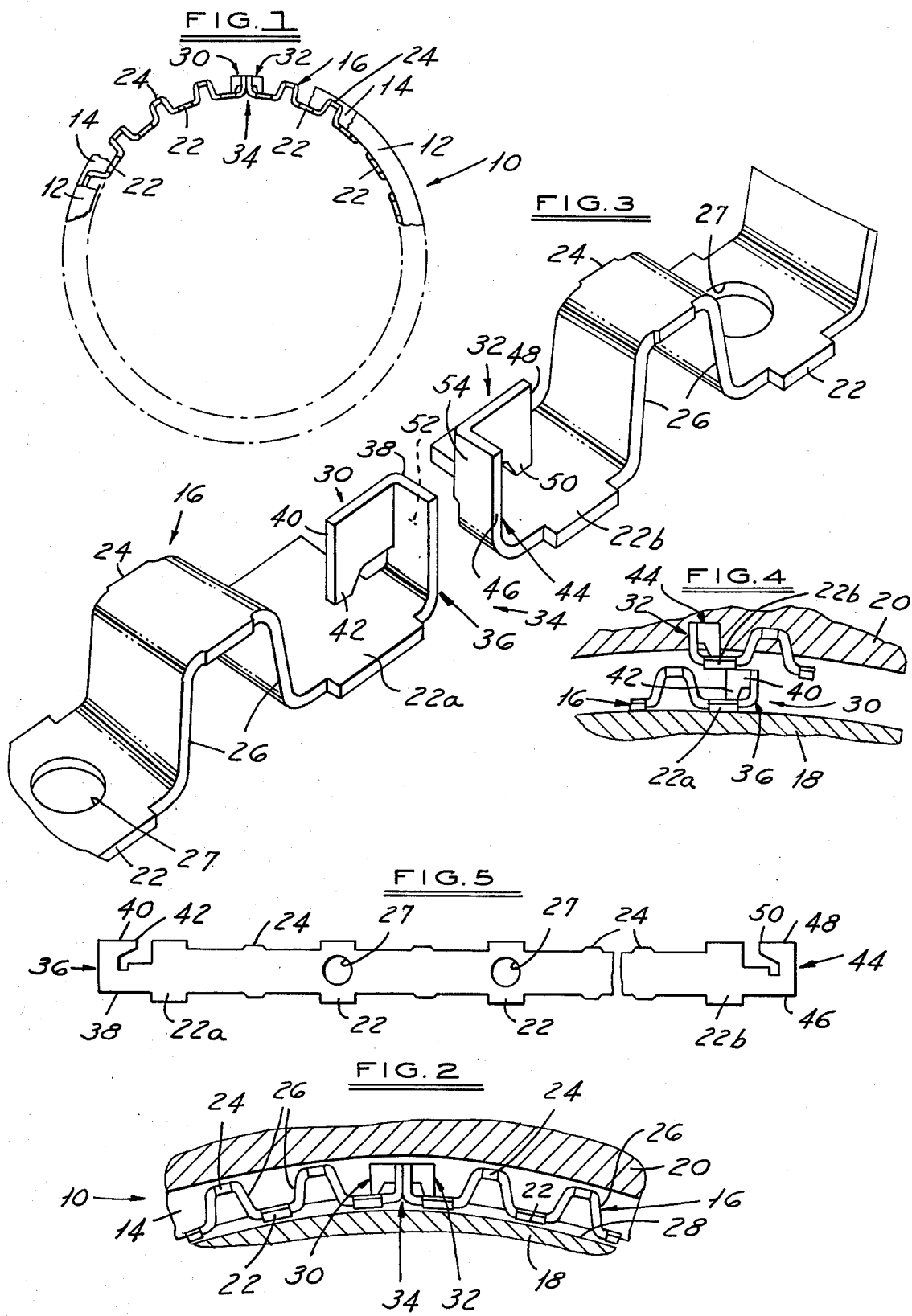

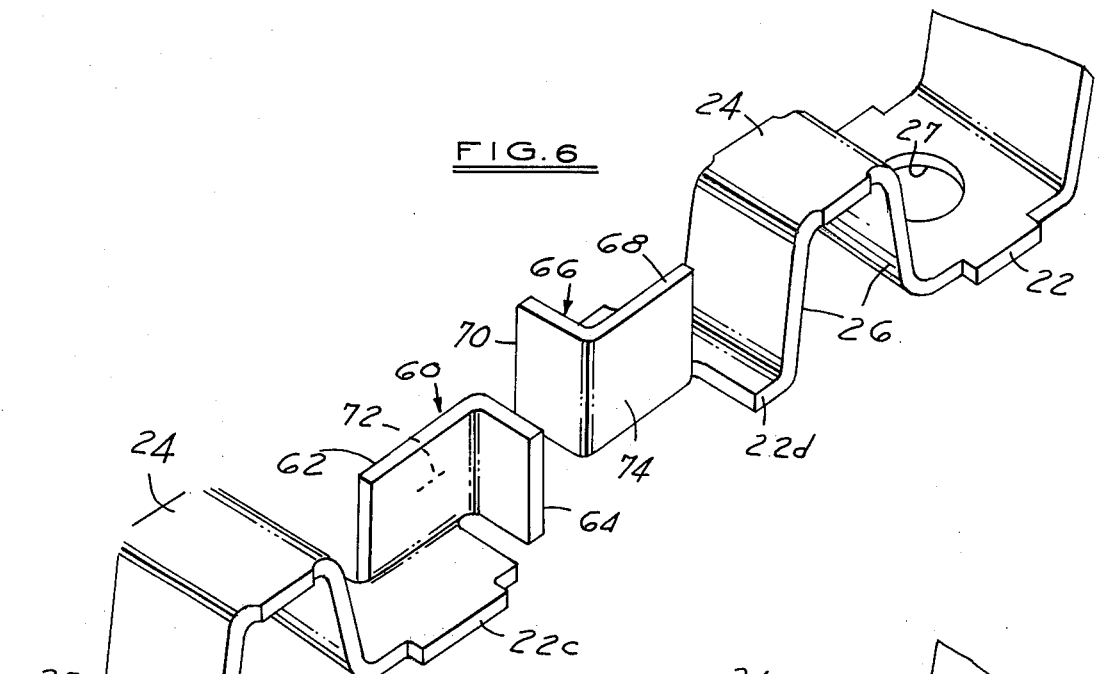
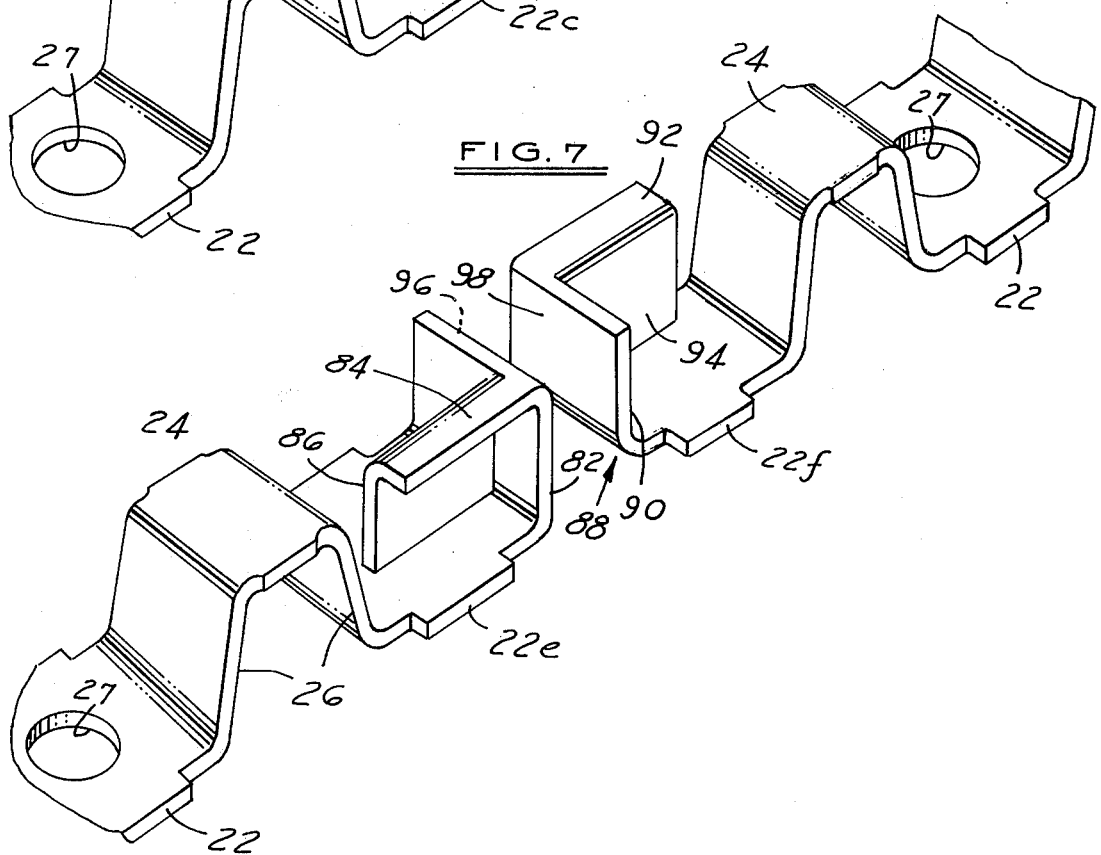

PISTON RING SPACER-EXPANDER WITH OVERLAP-PREVENTING EXPANDER JOINT

The present invention relates to reciprocating piston oil control rings and, more specifically, to oil control rings of the type which include a corrugated parted circumferentially compressible spacer-expander adapted to have aligned ends at the expander joint.

It has heretobefore been recognized that the free ends of spacer-expanders of the described type, an early example of which is disclosed in Olson U.S. Pat. No. 2,789,872, may become overlapped during assembly and installation into an engine, such that the corrugations or crowns at the parted expander ends become internested and locked. The reduced circumference of such an improperly installed expander prevents satisfactory operation of the overall oil control ring. Various solutions to this recognized problem have heretofore been proposed. For example, in Warrick U.S. Pat. No. 3,166,331 and DeBruin U.S. Pat. No. 3,338,582 it was proposed that the free spring ends which comprise the expander joint should include one or more radially extending tabs or legs integral with the radially inner end crowns and augulated or spaced with respect to the end crowns such that the tabs prevent the end crowns from becoming internested. However, such tabs tend to become crushed if improper installation of the spacer-expander is attempted, thereby effectively blocking such improper installation, but also destroying the spacer-expander which must then be scrapped. Another solution heretobefore proposed in DeBruin U.S. Pat. No. 3,427,014 requires that a separate nylon or plastic block be inserted between the expander end crowns, thereby effectively blocking the opposing end crown from becoming nested therebetween. However, this solution is relatively expensive inasmuch as it involves fabrication and assembly of two separate elements. Moreover, the latter solution is not readily adaptable for use in small engines which require spacer-expanders of reduced axial dimension.

It is an object of the present invention to provide a spacer-expander of the above-described type which is economical to fabricate and install. More specifically, it is an object of the present invention to provide a spacer-expander of the described type having a sturdy, integrally-formed, overlap-preventing expander joint.

The above and other objects are accomplished in accordance with the present invention by providing an improved spacer-expander in which each of the respective expander ends is formed in a multiple-bend box-like structure which is self-supporting when stressed from the circumferential direction by the opposing expander end during abutment therebetween, or from the radial direction by an inner crown of the opposing expander end when the ends become overlapped during installation. Each box-like structure comprises an end tab extending radially from and contiguous with an adjacent end crown. Each end tab includes a plurality of successively contiguous end tab portions formed at substantially right angles with respect to each other.

The novel features which are considered to be characteristic of the present invention are set forth in paticular in the appended claims. The invention itself, however, together with additional objects, features and advantages thereof, will be best understood from the following description when read in conjunction with the accompanying drawings in which:

FIG. 1 is a partially sectioned plan view of an oil control ring which includes a spacer-expander in accordance with one preferred embodiment of the invention;

FIG. 2 is a sectional partial plan view of the oil control ring of FIG. 1 installed in an engine;

FIG. 3 is a partial perspective view of the spacer-expander shown in FIGS. 1 and 2 in which the improved expander joint is highlighted;

FIG. 4 is a partial plan view showing the improved expander joint in operation preventing installation of an overlapped assembly;

FIG. 5 is a fragmentary plan view showing end portions of the stamped ribbon stock for the spacer-expander of FIG. 1; and FIGS. 6 and 7 are enlarged perspective views showing alternative embodiments of the improve expander joint provided by the invention.

Referring to FIGS. 1–5, the oil control ring 10 depicted therein is generally of the type shown in the above-referenced Olson patent, and comprises a pair of annular oil-scraping units 12,14 axially held by a circular parted spacer-expander 16 on opposite sides of a radially-facing seal groove in an engine piston 18 and radially urged by expander 16 into sealing engagement with an opposing cylinder wall 20. Expander 16 comprises alternating concentric series of circumferentially spaced radially inner and outer crowns 22,24 interconnected by alternating contiguous legs 26 generally diverging in the radial direction and lending a generally corrugated appearance to the spacer-expander when viewed in the axial direction, from whence the term "corrugated spacer-expander" is derived. Oil drain ports 27 are provided in inner crowns 22. In the assembled condition, as viewed in FIG. 2, inner crowns 22 are spaced from the piston groove root 28. The ends 30,32 which form the joint 34 of the parted expander are in abutment.

In accordance with the present invention, expander ends 30,32 are respectively formed in multiplebend box-like self-supporting structures. At spring end 30, inner and crown 22a terminates in a radially extending tab 36 contiguous with crown 22a over only a portion 38 of its axial width. The remaining tab portion 40 is contiguous with tab portion 38 and is bent back toward crown 22a at an angle of approximately ninety degrees with respect to tab portion 38. Portion 40 has a tapering foot 42 extending radially inwardly therefrom toward end crown 22a and terminating at approximately the outer surface of the end crown. A similar, complementary tab 44, comprising a tab portion 46 contiguous with end crown 22b, a portion 48 contiguous with portion 46 and bent at a right angle with respect thereto, and a tapering foot 50, is formed at the opposing end of expander 16 to provide a pair of opposing tab faces 52,54 adapted to abut each other in the circumferential direction when spacer-expander 16 is assembled into an engine.

As illustrated in FIG. 4, the bent portion 40 of tab 36 blocks a portion of the expander corrugation formed by end crown 22a, such that the opposing end crown 22b cannot become nested therein should the expander ends 30,32 become overlapped. Morover, overlapped expander ends 36,44 (FIG. 4) have a diameter greater than the diameter of cylinder wall 20, such that piston 18 cannot be installed into the cylinder. It will be further appreciated that tab 36 is supported at two points with respect to end crown 22a-i.e., at the contiguity between tab 36 and crown 22a and at the tip of foot 42. Thus, tab 30 is firmly supported against collapse due to pressure from opposing expander end 32 from either the circumferential or the radial direction.

Spacer-expander 16 is preferably formed in a progressive blanking and bending operation from a continuous strip of spring material, one section of which is shown in FIG. 5. With specific reference to the improved expander joint provided by the invention, end tabs 36,44 are formed by first blanking the respective end crowns 22a,22b, tab portions 38,40 and 46,48 and feet 42,50. Tab portions 40, 48 are then bent upwardly with respect to the plane of the blanked strip. Then tab portions 38,46 are bent upwardly with respect to the associated end crowns 22a,22b to bring the tab feet into proximity with the end crowns as shown in FIG. 3.

A first alternative embodiment of the invention is shown in FIG. 6, wherein reference numerals identical to those used in FIGS. 1–5 indicate identical portions of the spacer-expander. In the embodiment of FIG. 6, a first spring end tab 60 comprises a side portion 62 contiguous with and extending outwardly from associated end crown 22c, such that the first portion of the spacer end tab is this time contiguous with the associated end crown along a side edge rather than along an end edge of the crown as in the embodiment of FIGS. 1–5. A second tab portion 64 is contiguous with portion 62 along an end edge thereof and extends axially with respect thereto. Similarly, the opposing spring end tab 66 is formed of complementary successively contiguous tab portions 68,70. In the embodiment of FIG. 6, spring end tabs 60,66 are formed to have a pair of axial faces 72,74 adapted for sliding abutment as the spring is installed into an engine.

In a second alternative embodiment of the invention shown in FIG. 7, a first spring end tab 80 comprises a first tab portion 82 extending radially from an end edge of the associated end crown 22e and contiguous with such end crown over substantially the entire axial width thereof. A second tab portion 84 is contiguous with an end edge of tab portion 82 and extends therefrom at a right angle in the general direction of associated end crown 22e. A third tab portion 86 extends radially inwardly from portion 84 to terminate in a foot proximate to the adjacent outer surface of end crown 22e. Similarly, the opposing expander end tab 88 comprises a first tab portion 90 contiguous along an end edge of associated end crown 22f, a second tab portion 92, and a foot portion 94 extending back toward the outer surface of end crown 22f. Thus, expander ends 80,88 have respective end faces 96,98 adapted for abutment with each other in the circumferential direction as the spacer-expander is installed into an engine.

The invention claimed is:

1. In a parted circular spacer-expander for use in a piston oil control ring and including a plurality of alternating concentric circumferentially spaced radially outer and inner crowns integrally interconnected by generally diverging legs, the improvement wherein each end crown at the parting of the ring has an end tab extending therefrom comprising a plurality of successive contiguous portions formed at substantially right angles with respect to each other, the first said tab portion being contiguous with an edge of said end crown and extending radially therefrom, other of said end tab portions extending back toward the corresponding end crown such that an edge of another of said tab portions is disposed at substantially the radius of said corresponding end crown, said end tabs being substantially self-supporting under stress from both the circumferential and radial directions.

2. The improvement set forth in claim 1 wherein said end crowns each comprise inner crowns.

3. The improvement set forth in claim 1 wherein said end tabs are adapted for abutment with each other in the circumferential direction.

4. The improvement set forth in claim 3 wherein each said first portion of said end tabs extends radially from an end edge of the contiguous end crown and is contiguous with said end crown over only a portion of the width of said end crown, and wherein each said end tab further comprises a second tab portion contiguous with a side edge of said first portion and angulated with respect thereto in the direction of said associated end crown, said second tab portion terminating in proximity to an adjacent surface of said end crown.

5. The improvement set forth in claim 3 wherein each said first portion of said end tabs extends radially from an end edge of said contiguous end crown and is contiguous with said end crown of over substantially the entire width thereof, and wherein each said end tab further comprises a second tab portion contiguous with an end edge of said first tab portion and angulated with respect thereto in the direction of said associated end crown, and a third tab portion extending from said second tab portion and terminating in proximity to an adjacent surface of said end crown.

6. The improvement set forth in claim 1 wherein said end tabs are adapted for sliding abutment with each other along opposed axially-directed faces.

7. The improvement set forth in claim 6 wherein each said first portion of said end tabs extends radially from a side edge of the contiguous end crown, and wherein each said end tab further comprises a second tab portion contiguous with an end edge of said first portion and angulated with respect thereto toward the associated end crown.

8. In a parted circular spacer-expander for use in a piston oil control ring and including a plurality of alternating concentric circumferentially spaced radially outer and inner crowns integrally interconnected by generally diverging legs, the improvement wherein each end crown at the parting of the ring has an end tab extending therefrom comprising a plurality of successive contiguous portions formed at substantially right angles with respect to each other, each said first portion of said end tabs extending radially from an end edge of the contiguous end crown and being contiguous with said end crown over only a portion of the width of said end crown, each said end tab further comprising a second tab portion contiguous with a side edge of said first portion and angulated with respect thereto in the direction of said associated end crown, said second tab portion terminating in proximity to an adjacent surface of said end crown, said end tabs being adapted for abutment with each other in the circumferential direction.

9. In a parted circular spacer-expander for use in a piston oil control ring and including a plurality of alternating concentric circumferentially spaced radially outer and inner crowns integrally interconnected by generally diverging legs, the improvement wherein each end crown at the parting of the ring has an end tab extending therefrom comprising a plurality of successive contiguous portions formed at substantially right angles with respect to each other, each said first portion of said end tabs extending radially from an end edge of said contiguous end crown and being contiguous with said end crown of over substantially the entire width thereof, each said end tab further comprising a second tab portion contiguous with an end edge of said first tab portion and angulated with respect thereto in the direction of said associated end crown and a third tab portion extending from said second tab portion and terminating in proximity to an adjacent surface of said end crown, said end tabs being adapted for abutment with each other in the circumferential direction.

10. In a parted circular spacer-expander for use in a piston oil control ring and including a plurality of alternating concentric circumferentially spaced radially outer and inner crowns integrally interconnected by generally diverging legs, the improvement wherein each end crown at the parting of the ring has an end tab extending therefrom comprising a plurality of successive contiguous portions formed at substantially right angles with respect to each other, each said first portion of said end tabs extending radially from a side edge of the contiguous end crown, each said end tab further comprising a second tab portion contiguous with an end edge of said first portion and angulated with respect thereto toward the associated end crown, said end tabs being adapted for sliding abutment with each other along opposed axial faces.

* * * * *